(12) United States Patent
Kikuiri (10) Patent No.: US 7,130,161 B2
(45) Date of Patent: Oct. 31, 2006

(54) MAGNETIC HEAD HAVING MARKER LAYER, AND TAPE-MEDIUM READING AND WRITING APPARATUS

(75) Inventor: Katsuya Kikuiri, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 548 days.

(21) Appl. No.: 10/715,816

(22) Filed: Nov. 18, 2003

(65) Prior Publication Data
US 2004/0179308 A1    Sep. 16, 2004

(30) Foreign Application Priority Data
Nov. 28, 2002  (JP)  ............................. 2002-345978

(51) Int. Cl.
    *G11B 5/39*       (2006.01)
(52) U.S. Cl. ...................... 360/313; 360/319
(58) Field of Classification Search ................ 360/313, 360/319, 76; 428/811.4
See application file for complete search history.

(56) References Cited

U.S. PATENT DOCUMENTS

| | | | |
|---|---|---|---|
| 4,763,210 A | 8/1988 | Grant | |
| 6,115,216 A | 9/2000 | Yoda et al. | |
| 6,124,047 A * | 9/2000 | Hasegawa | 428/811.4 |
| 6,342,993 B1 | 1/2002 | Sato | |
| 6,657,824 B1 * | 12/2003 | Onuma | 360/319 |
| 6,683,760 B1 * | 1/2004 | Kikuiri | 360/319 |
| 6,700,729 B1 * | 3/2004 | Beck et al. | 360/76 |
| 6,898,045 B1 * | 5/2005 | Beck et al. | 360/76 |
| 2001/0043444 A1 * | 11/2001 | Ando et al. | 360/313 |

FOREIGN PATENT DOCUMENTS

| | | |
|---|---|---|
| JP | 2001-67610 | 3/2001 |
| JP | 2001-84524 | 3/2001 |
| JP | 2001-93120 | 4/2001 |

* cited by examiner

*Primary Examiner*—Tianjie Chen
(74) *Attorney, Agent, or Firm*—Brinks Hofer Gilson & Lione (57) ABSTRACT

A magnetic head includes a first shielding layer, a second shielding layer, an MR element, and a marker layer. The layers and the element are exposed from a medium sliding surface while being inclined at an azimuth angle. A major part of the marker layer is disposed inside two imaginary azimuth lines, which extend straight in one direction through both end portions in the track-width direction of the MR element, in the track-width direction, and both end portions thereof are disposed outside the imaginary azimuth lines in the track-width direction. In the magnetic head, the MR height can be precisely controlled, and changes in asymmetry are reduced.

19 Claims, 8 Drawing Sheets

MAGNETIC HEAD HAVING MARKER LAYER, AND TAPE-MEDIUM READING AND WRITING APPARATUS

BACKGROUND OF THE INVENTION

1. Field of the Invention

The present invention relates to a magnetic head and a tape-medium reading and writing apparatus that read magnetically recorded information by helical scanning.

2. Description of the Related Art

Recently, a sliding magnetic head having an MR (magnetoresistive) element has been developed as a magnetic reading head for use in digital video recorders and digital audio recorders. This magnetic head is used while being mounted on a rotary cylinder with a base plate therebetween in a state in which an MR element is inclined at a predetermined azimuth angle. The magnetic head reads magnetically recorded information using so-called helical scanning. That is, magnetically recorded information is read by rotating the rotary cylinder with the magnetic head in one direction while sliding a magnetic tape medium in the same direction.

Information is magnetically recorded in the form of digital signals with inductive heads with the narrow track width by so-called guard-bandless recording. That is, two to four inductive heads having different azimuth angles are mounted on a rotary cylinder, and are alternately brought into contact with a magnetic tape medium by the rotation of the rotary cylinder, thereby sequentially superimposing a track on a part of a track previously written on the magnetic tape medium.

In order to precisely read the tracks written by the above-described guard-bandless recording, the height from the base plate to the center in the track width of the MR element must be precisely fixed among the magnetic heads. For that purpose, a method has been adopted in which the MR element is positioned while observing a marker layer provided on a shielding layer under an optical microscope. An example of a marker layer is a convex portion provided on a shielding layer, as disclosed in FIG. 3 or 4 of Japanese Unexamined Patent Application Publication No. 2001-93120.

Helical scanning generally adopts a narrow write/wide read method in which the reading track width is larger than in a plate-shaped magnetic head, and the MR element has a track width that is almost double the written track width. For this reason, the reading characteristics of the MR element are required to be fixed at any position in the track width in order to reduce reading errors.

However, in the magnetic head disclosed in the above patent publication, the width of the convex portion is smaller than the track width of the MR element, and the height between the base plate and the MR element is substantially equal to the height of the convex portion. Therefore, both end portions of the convex portion in the direction of the track width of the MR element are placed within the track width. Because of such a convex portion, the asymmetry of the magnetic head (symmetry of the reproduced signal) substantially changes in the direction of the track width. Consequently, the reading characteristics cannot be fixed.

SUMMARY OF THE INVENTION

The present invention has been made in view of the above circumstances, and an object of the present invention is to provide a magnetic head and a tape-medium reading and writing apparatus that can precisely determine the height of a magnetoresistive element and that reduce the influence of a marker layer on the asymmetry.

In order to achieve the above object, according to an aspect, the present invention provides a magnetic head disposed on a rotary cylinder rotatable in a predetermined direction, and having a medium sliding surface substantially flush with a peripheral surface of the rotary cylinder, wherein the magnetic head includes a first shielding layer composed of a magnetic material, a second shielding layer spaced from the first shielding layer substantially parallel thereto and composed of a magnetic material, a magnetoresistive element interposed between the first and second shielding layers and insulated from the first and second shielding layers by a nonmagnetic insulating layer, and a marker layer disposed on a side of the first shielding layer remote from the magnetoresistive element so as to determine the center in a track-width direction of the magnetoresistive element, wherein the layers and the element are exposed from the medium sliding surface while being inclined at a predetermined azimuth angle to the predetermined direction, a major part of the marker layer is provided inside two imaginary azimuth lines extending straight in the predetermined direction through both end portions in the track-width direction of the magnetoresistive element, and both end portions of the marker layer are disposed outside the two imaginary azimuth lines in the track-width direction.

In such a magnetic head, since both end portions of the marker layer are disposed outside the two imaginary azimuth lines in the track-width direction, the width of the marker layer is larger than the track width of the magnetoresistive element. Moreover, since a part of the marker layer is provided inside the two imaginary azimuth lines in the track-width direction, the entire magnetoresistive element inevitably opposes the marker layer. Since the end portions of the marker layer do not exist in an area inside the imaginary azimuth lines, the asymmetry (symmetry of the reproduced signal) of the magnetic head will not change in the direction of the track width of the magnetoresistive element, and stable reproduction characteristics can be achieved.

Preferably, the marker layer is positioned so that a head center line extending straight in the predetermined direction through the center in the track-width direction of the magnetoresistive element passes through the center in the track-width direction of the marker layer.

In this case, since the centers of the marker layer and the magnetoresistive element are placed on the head center line, the center of the magnetoresistive element can be easily determined by detecting the center of the marker layer. This allows the height of the magnetoresistive element to be adjusted easily.

Preferably, the marker layer is positioned so that a normal line extending straight through the center in the track-width direction of the magnetoresistive element in a direction orthogonal to the track-width direction passes through the center in the track-width direction of the marker layer.

In this case, since the centers of the marker layer and the magnetoresistive element are placed on the normal line orthogonal to the track-width direction, the center of the magnetoresistive element can be easily determined by detecting the center of the marker layer. This allows the height of the magnetoresistive element to be adjusted easily.

Preferably, the marker layer is composed of a magnetic material or a nonmagnetic material.

When the marker layer is composed of a magnetic material, the material may be the same as a material of the first shielding layer. Therefore, the number of kinds of materials is reduced, and the configuration of the magnetic head can be simplified. When the marker layer is composed of a nonmagnetic material, the influence of the marker layer on the asymmetry is substantially lessened, and the changes in the asymmetry can be reduced further.

The marker layer may be in contact with the first shielding layer. Furthermore, another nonmagnetic insulating layer may be provided between the marker layer and the first shielding layer.

When the marker layer is in contact with the first shielding layer, the layers can be simultaneously produced, and the configuration of the magnetic head can be simplified. When another nonmagnetic insulating layer is provided between the marker layer and the first shielding layer, the distance between the magnetoresistive layer and the marker layer is increased, and therefore, the influence of the marker layer on the asymmetry can be reduced.

Preferably, the medium sliding surface extends in the predetermined direction, or is curved in the direction orthogonal to the predetermined direction. Furthermore, the center in the track-width direction of the magnetoresistive element is placed at the top of the medium sliding surface curved in the direction orthogonal to the predetermined direction.

In this case, since the medium sliding surface is curved, it can smoothly touch a magnetic tape medium.

When the center of the magnetoresistive element is placed at the top of the medium sliding surface curved in the direction orthogonal to the predetermined direction, and the head center line passes through the center of the marker layer, end portions of the marker layer are disposed at the same distance from the top of the surface. That is, the end portions of the marker layer recede from the top by the same depth in the height direction of the magnetoresistive element. Since the focal depths of the end portions of the marker layer are equal, the height of the magnetoresistive element can be adjusted while observing the marker layer in a microscope or the like. Consequently, positioning can be performed easily and quickly.

According to another aspect, the present invention provides a tape-medium reading and writing apparatus having a tape loading path in which a magnetic tape medium drawn out of a tape reel is wound on a rotary cylinder that is rotatable in a predetermined direction, wherein the rotary cylinder is provided with a magnetic head with a medium sliding surface substantially flush with a peripheral surface of the rotary cylinder, wherein the magnetic head includes a first shielding layer composed of a magnetic material, a second shielding layer spaced from the first shielding layer substantially parallel thereto and composed of a magnetic material, a magnetoresistive element interposed between the first and second shielding layers and insulated from the first and second shielding layers by a nonmagnetic insulating layer, and a marker layer disposed on a side of the first shielding layer remote from the magnetoresistive element so as to determine the center in a track-width direction of the magnetoresistive element, wherein the layers and the element are exposed from the medium sliding surface while being inclined at a predetermined azimuth angle to the predetermined direction, and wherein a major part of the marker layer is provided inside two imaginary azimuth lines extending straight in the predetermined direction through both end portions in the track-width direction of the magnetoresistive element, and both end portions of the marker layer are disposed outside the imaginary azimuth lines in the track-width direction.

In such a tape-medium reading and writing apparatus, since both end portions of the marker layer are disposed outside the two imaginary azimuth lines in the track-width direction, the width of the marker layer is larger than the track width of the magnetoresistive element. Moreover, since a part of the marker layer is provided inside the two imaginary azimuth lines in the track-width direction, the entire magnetoresistive element inevitably opposes the marker layer. Since the end portions of the marker layer do not exist in an area inside the imaginary azimuth lines, the asymmetry (symmetry of the reproduced signal) of the magnetic head will not change in the direction of the track width of the magnetoresistive element, and stable reproduction characteristics can be achieved.

Preferably, the marker layer is positioned so that a head center line extending straight in the predetermined direction through the center in the track-width direction of the magnetoresistive element passes through the center in the track-width direction of the marker layer.

In this case, since the centers of the marker layer and the magnetoresistive element are placed on the head center line, the center of the magnetoresistive element can be easily determined by detecting the center of the marker layer. This allows the height of the magnetoresistive element to be adjusted easily.

Preferably, the marker layer is positioned so that a normal line extending straight through the center in the track-width direction of the magnetoresistive element in a direction orthogonal to the track-width direction passes through the center in the track-width direction of the marker layer.

In this case, since the centers of the marker layer and the magnetoresistive element are placed on the normal line orthogonal to the track-width direction, the center of the magnetoresistive element can be easily determined by detecting the center of the marker layer. This allows the height of the magnetoresistive element to be adjusted easily.

Preferably, the tape loading path includes guide posts provided on the upstream and downstream sides of the rotary cylinder to guide the magnetic tape medium drawn out of the tape reel onto the rotary cylinder, and a capstan provided on the downstream side of the rotary cylinder to feed the magnetic tape medium.

Further objects, features and advantages of the present invention will become apparent from the following description of the preferred embodiments with reference to the attached drawings.

DESCRIPTION OF THE PREFERRED EMBODIMENTS

First Embodiment

A first embodiment of the present invention will be described below with reference to the attached drawings.

Figure 1:
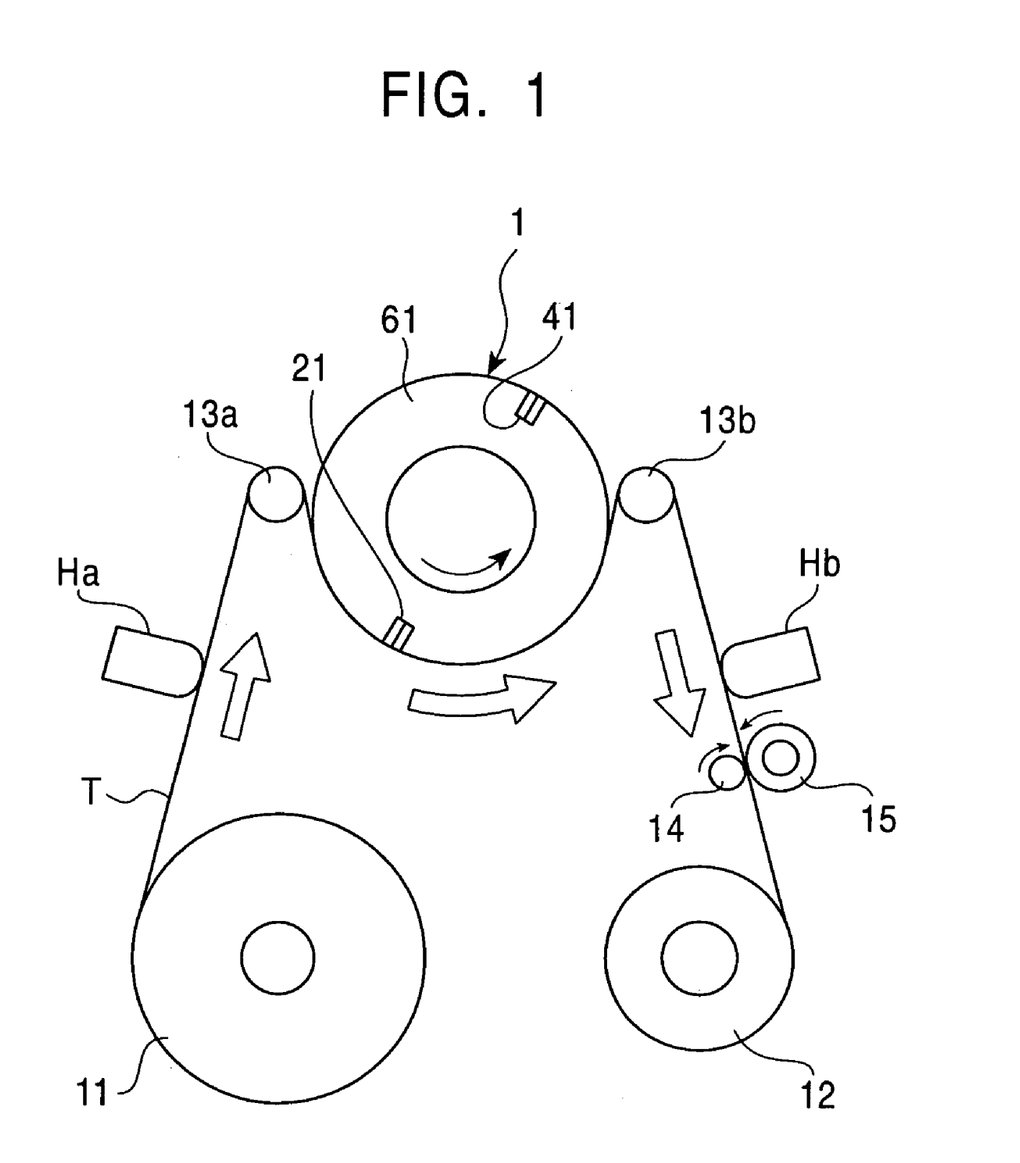
FIG. 1 is a schematic plan view showing a tape loading path in a tape-medium reading and writing apparatus according to a first embodiment of the present invention.
Figure 2:
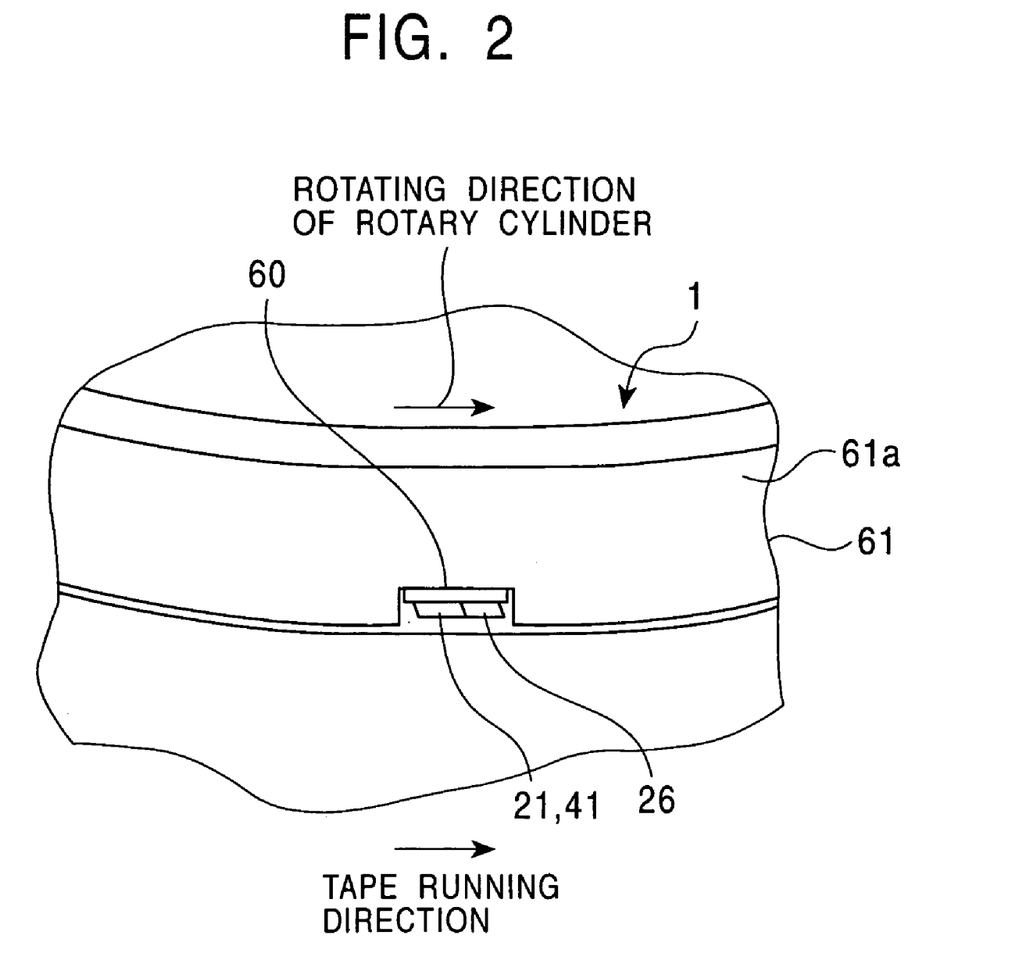
FIG. 2 is an enlarged partial view of a rotary head provided in the tape-medium reading and writing apparatus shown in FIG. 1.

FIG. 1 is a schematic plan view showing a tape loading path in a tape-medium reading and writing apparatus according to the first embodiment, and FIG. 2 is an enlarged partial view of a rotary head 1.

The tape-medium reading and writing apparatus shown in FIG. 1 is used in, for example, a video tape recorder, and includes a rotary head 1 that is rotationally driven by a motor. The rotary head 1 is provided with magnetic heads 21 and 41 according to the present invention. A magnetic tape (magnetic tape medium) T drawn out of a tape supply reel 11 is guided by a guide post 13a, and is wound on the rotary head 1 by a predetermined angle. The magnetic tape T is further guided by a guide post 13b, is advanced in the direction of the arrow in the figure by the rotation of a capstan 14 while being nipped between the capstan 14 and a pinch roller 15, and is finally wound around a tape takeup reel 12. A tape loading path including the rotary head 1 and the magnetic tape T is formed in this way. A full-width erasing head Ha and an audio head Hb are also provided in the tape loading path.

Referring to FIGS. 1 and 2, the rotary head 1 is roughly constituted by the two magnetic heads 21 and 41, and a rotary cylinder 61 having base plates 60 on which the magnetic heads 21 and 41 are mounted. The magnetic heads 21 and 41 are placed in symmetry with respect to a rotation axis of the rotary cylinder 61. Medium sliding surfaces 26 of the magnetic heads 21 and 41 are substantially flush with a peripheral surface 61a of the rotary cylinder 61. The rotary head 1 rotates in the direction of the arrow in the figures, and the magnetic tape T runs in the same direction.

Figure 3:
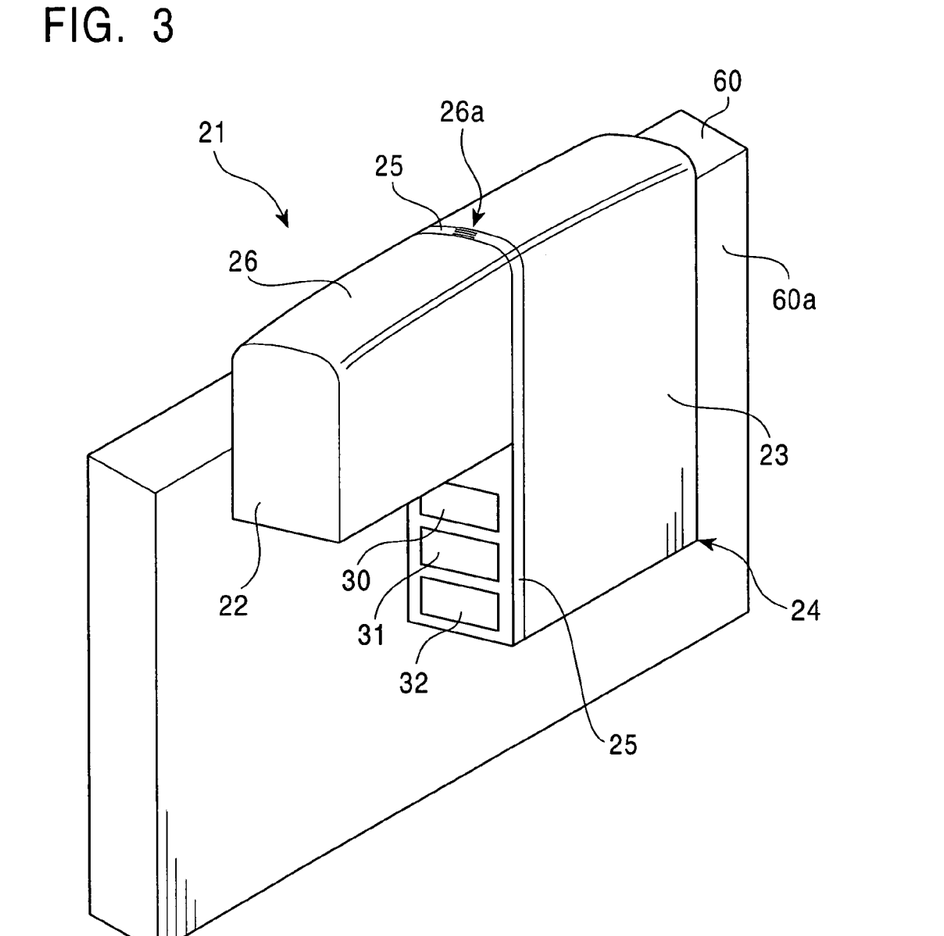
FIG. 3 is a perspective view of a magnetic head of the present invention provided in the rotary head shown in FIG. 2.
Figure 4:
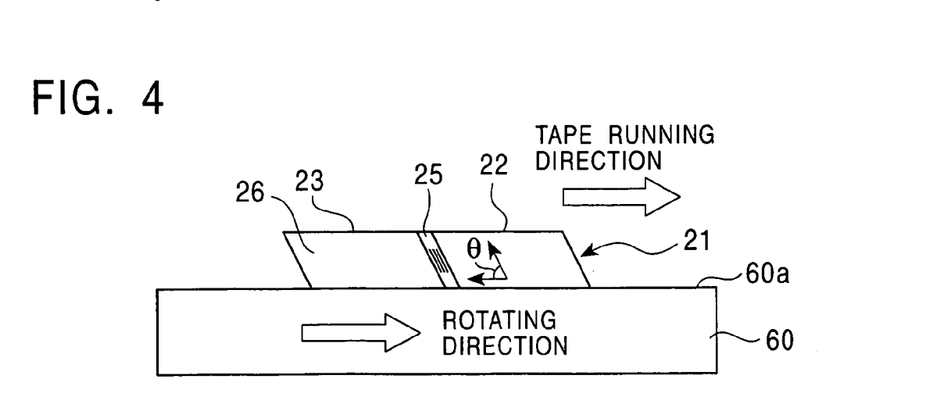
FIG. 4 is a plan view of the magnetic head, when viewed from the side of a medium sliding surface.
Figure 5:
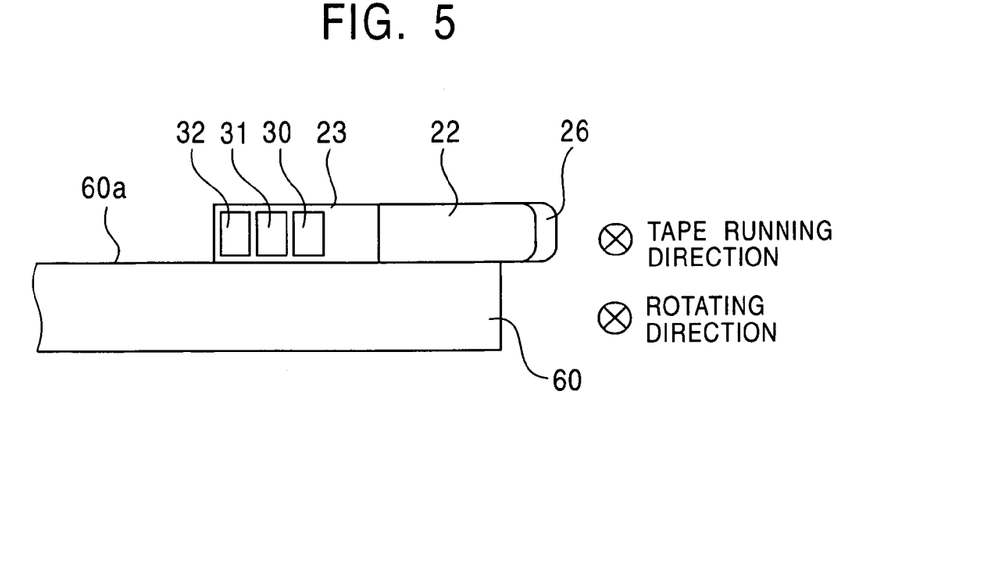
FIG. 5 is a side view of the magnetic head, when viewed from the downstream side in the rotating direction of a rotary cylinder.

FIG. 3 is a perspective view of the magnetic head 21, FIG. 4 is a plan view of the magnetic head 21, as viewed from the medium sliding surface 26, and FIG. 5 is a side view of the magnetic head 21, as viewed from the downstream side in the rotating direction of the rotary cylinder 61. Since the magnetic head 41 has the same structure as that of the magnetic head 21 shown in FIG. 3 except for the azimuth angle, a detailed description thereof is omitted.

As shown in FIG. 3, the magnetic head 21 is formed of a core block 24 shaped like a plate by bonding end faces of block-shaped core halves 22 and 23 with a core-containing layer 25 therebetween. The magnetic head 21 is fixed to the base plate 60 while one large surface of the core block 24 is bonded to one side face (one surface) of the base plate 60 and one end of the core block 24 slightly protrudes from an end portion of the base plate 60.

The core halves 22 and 23 are composed of a highly wear-resistant ceramic material, such as $CaTiO_3$ or $Al_2O_3+TiC$, or a magnetic material such as ferrite.

As shown in FIG. 3, one surface of the magnetic head 21 protruding outward from the base plate 60 is worked into an elongated curved surface extending along the rotating direction of the magnetic head 21, thereby forming a medium sliding surface 26. As shown in FIGS. 3 and 5, the medium sliding surface 26 is curved in the direction orthogonal to the rotating direction of the magnetic head 21. Therefore, the medium sliding surface 26 is convexly shaped to be curved outwards from a top portion 26a. This allows a magnetic tape medium to smoothly touch the medium sliding surface 26.

A magnetic head core section including a writing core portion and a reading core portion is built in a portion of the core-containing layer 25 exposed from the top portion 26a of the medium sliding surface 26. Magnetic poles at the leading ends of the core portions are exposed in the center of the medium sliding surface 26. Accordingly, magnetic information can be written on and read from a magnetic recording medium, such as a magnetic tape, that slides relative to the medium sliding surface 26.

The length of the core half 22 described above is almost half the length of the core half 23. Terminal pads 30, 31, and 32 for connection to a writing coil or a reading MR element in the magnetic head core section provided in the core-containing layer 25 are provided in a portion of the core-containing layer 25 disposed on a side face of the larger core half 23.

That is, since the core half 22 is smaller than the core half 23, an end portion of the core-containing layer 25 provided on the side face of the core half 23 is partly exposed, and the terminal pads 30, 31, and 32 are provided thereon in line in that order from the side of the medium sliding surface 26. The number of terminal pads is not specifically limited, and may be two, four, or more corresponding to the number of necessary terminals in the magnetic head core section provided in the core-containing layer 25.

As shown in FIG. 4, the core halves 22 and 23 are worked in the shape of a prism of parallelogrammatic cross section in order to form an azimuth angle when they slide relative to the magnetic tape medium.

That is, as shown in FIG. 4, the core halves 22 and 23 are substantially parallelogrammatic in plan view, and the core-containing layer 25 held therebetween is inclined at a predetermined azimuth angle θ with respect to one surface 60a of the base plate 60 opposite to the tape running direction. The azimuth angle θ is set within the range of 6° to 25° in accordance with the apparatus to which the magnetic head is applied. For example, when the magnetic head 21 is used as a head of a digital video recorder, the azimuth angle θ is set at 25°.

Figure 6:
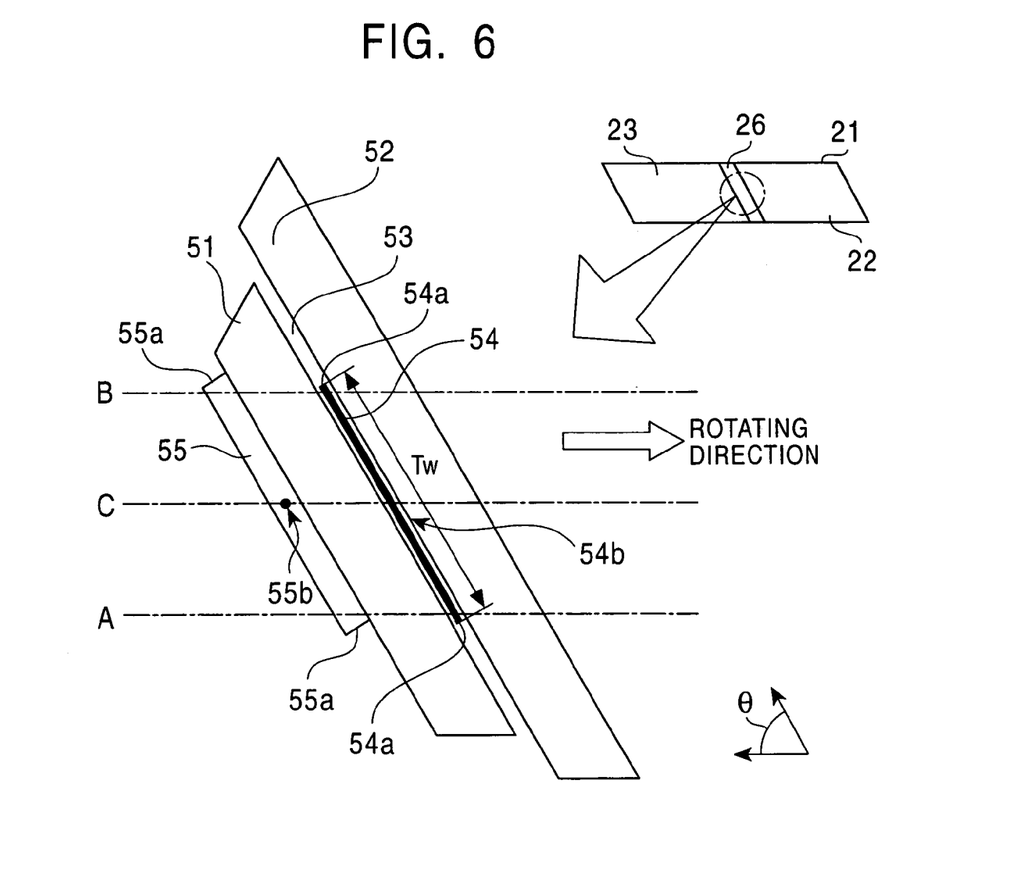
FIG. 6 is an enlarged schematic plan view showing a state in which a core-containing layer exposed from the medium sliding surface of the magnetic head is inclined at an azimuth angle $\theta$.
Figure 7:
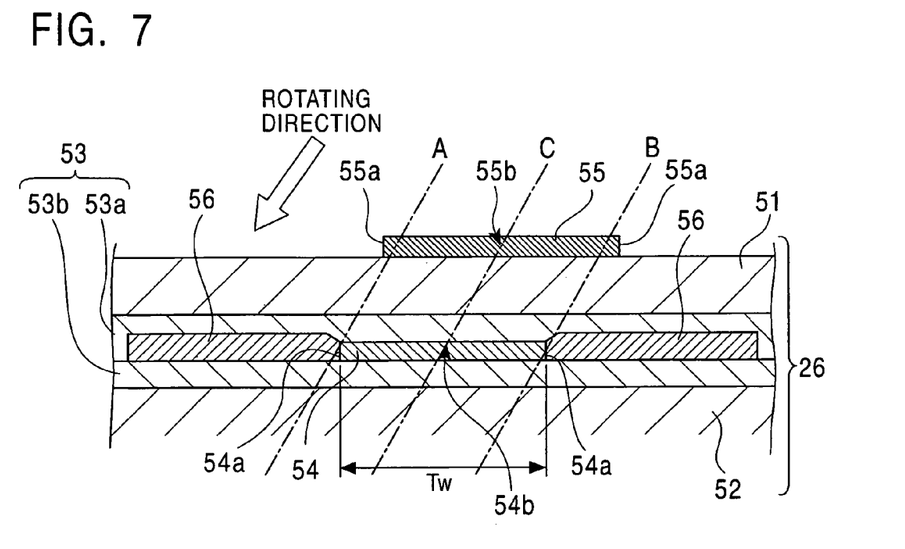
FIG. 7 is an enlarged schematic plan view of the core-containing layer exposed from the medium sliding surface of the magnetic head.

FIGS. 6 and 7 are enlarged plan views showing the principal part of the core-containing layer 25 in the magnetic head 21. FIG. 6 shows a state in which the core-containing layer 25 exposed from the medium sliding surface 26 is inclined at an azimuth angle θ to the surface 60a of the base plate 60, in a manner similar to that in FIG. 4. FIG. 7 shows a state in which the principal part of the core-containing layer 25 shown in FIG. 6 is reset so that the core half 22 is disposed on the lower side.

As shown in FIGS. 6 and 7, the core-containing layer 25 includes a first shielding layer 51 made of a magnetic material, a second shielding layer 52 spaced from the first shielding layer 51 near parallel thereto and made of a magnetic material, an MR element 54 disposed between the first and second shielding layers 51 and 52 and insulated therefrom by a nonmagnetic insulating layer 53, and a marker layer 55 disposed on a side of the first shielding layer 51 remote from the MR element 54. The first and second shielding layers 51 and 52, the nonmagnetic insulating layer 53, the MR element 54, and the marker layer 55 are exposed from the medium sliding surface 26 while being inclined at an azimuth angle θ with respect to the head rotating direction.

The MR element 54 is generally called a magnetoresistive element, and includes a GMR (giant magnetoresistive) element and a TMR (tunnel magnetoresistive) element. The MR element 54 has a track width Tw parallel to the first and second shielding layers 51 and 52. For example, the track width Tw is set within the range of 3 μm to 20 μm. The MR element 54 is insulated from the first and second shielding layers 51 and 52 by first and second nonmagnetic insulating layers 53a and 53b (nonmagnetic insulating layer 53), as shown in FIG. 7.

Electrode layers 56 for sending various signals are provided at both end portions 54a of the MR element 54 in the direction of the track width Tw.

The first and second shielding layers 51 and 52 are made of a magnetic material such as a NiFe alloy, and have a width larger than the track width Tw of the MR element 54. Preferably, the thicknesses of the first and second shielding layers 51 and 52 are within the range of 1 μm to 4 μm. The marker layer 55 that is convex in plan view is disposed on a side of the first shielding layer 51 remote from the MR element 54. That is, the marker layer 55 having a predetermined thickness in plan view is disposed on the first shielding layer 51 substantially parallel to the track width Tw of the MR element 54. Both end portions 55a of the marker layer 55 steeply rise from the first shielding layer 51.

The marker layer 55 is made of a magnetic material such as a NiFe alloy, in a manner similar to that in the first shielding layer 51. In particular, when the material of the marker layer 55 is the same as that of the first shielding layer 51, the number of kinds of materials is reduced, and the structure of the magnetic head 21 can be simplified. Preferably, the marker layer 55 is formed by plating. Plating allows both end portions 55a of the marker layer 55 to steeply rise from the first shielding layer 51. Consequently, the width accuracy of the marker layer 55 is increased, and the MR element 54 can be easily positioned by using the marker layer 55.

A description will now be given of the positional relationship between the marker layer 55 and the MR element 54.

In FIGS. 6 and 7, two imaginary azimuth lines A and B are shown. The imaginary azimuth lines A and B extend straight in the rotating direction of the magnetic head 21 through both end portions 54a of the MR element 54 in the direction of the track width Tw. The marker layer 55 is positioned so that a major part thereof is placed inside the imaginary azimuth lines A and B in the direction of the track width Tw. Both end portions 55a of the marker layer 55 are provided outside the imaginary azimuth lines A and B in the direction of the track width Tw.

An area inside the imaginary azimuth lines A and B in the direction of the track width Tw refers to an area therebetween, and an area outside the imaginary azimuth lines A and B in the direction of the track width Tw refers to an area other than the area therebetween.

A head center line C is also shown in FIGS. 6 and 7. The head center line C extends straight in the rotating direction of the magnetic head 21 through a center 54b of the MR element 54 in the direction of the track width Tw. The marker layer 55 is positioned so that the head center line C passes through a center 55b thereof in the direction of the track width Tw.

Since the major part of the marker layer 55 is disposed inside the imaginary azimuth lines A and B in the direction of the track width Tw, it inevitably opposes the entire MR element 54 in the rotating direction of the magnetic head 21. Also, since the end portions 55a of the marker layer 55 are disposed outside the imaginary azimuth lines A and B in the direction of the track width Tw of the MR element 54, the width of the marker layer 55 is larger than the track width Tw. More specifically, it is preferable that the width of the marker layer 55 be within the range of 5 μm to 25 μm and be larger than the track width Tw of the MR element 54. It is also preferable that the thickness of the marker layer 55 be within the range of 2 μm to 4 μm.

When the marker layer 55 and the MR element 54 are positioned in the above-described relationship, the end portions 55a of the marker layer 55 do not exist inside the imaginary azimuth lines A and B. Therefore, the asymmetry (symmetry of the reproduced signal) of the magnetic head 21 does not change in the direction of the track width Tw of the MR element 54.

In particular, when the marker layer 55 is provided substantially parallel to the direction of the track width Tw of the MR element 54, changes in asymmetry of the MR element 54 in the overall direction of the track width Tw are reduced considerably.

Since the head center line C passing through the center 54b of the MR element 54 also passes through the center 55b of the marker layer 55, the center 54b of the MR element 54 and the center 55b of the marker layer 55 are aligned along the head center line C. Consequently, it is possible to easily determine the center of the MR element 54 by detecting the center of the marker layer 55, and to thereby easily adjust the height of the MR element 54.

In particular, when the marker layer 55 is substantially parallel to the direction of the track width Tw of the MR element 54, the height of the MR element 54 can be adjusted more easily.

Furthermore, when the center 54b of the MR element 54 is placed at the top portion 26a of the medium sliding surface 26 curved in the direction orthogonal to the rotating direction of the magnetic head 21, that is, in the widthwise direction, and the head center line C passes through the center 55b of the marker layer 55, both end portions 55a of the marker layer 55 are disposed at the same distance from the top portion 26a. That is, the end portions 55a recede from the top portion 26a by the same height in the height direction of the MR element 54. Since the focal depths of the end portions 55a are equal, the height of the MR element 54 can be adjusted while observing the marker layer 55 in a microscope or the like without changing the focal depths. Consequently, positioning can be performed easily and quickly.

In the magnetic head 21 of the first embodiment, the marker layer 55 may be composed of a nonmagnetic material. In this case, the influence of the marker layer 55 on the asymmetry is substantially lessened, and changes in the asymmetry can be reduced further.

Second Embodiment

Figure 8:
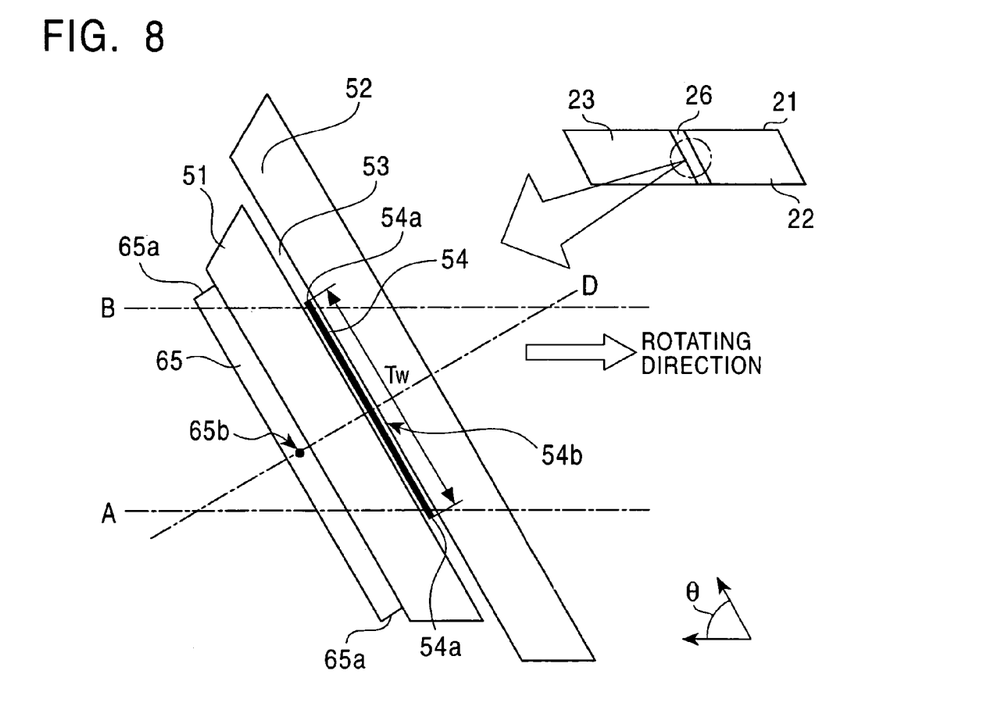
FIG. 8 is an enlarged schematic plan view showing a state in which a core-containing layer exposed from a medium sliding surface of a magnetic head according to a second embodiment of the present invention is inclined at an azimuth angle θ.

A second embodiment of the present invention will now be described with reference to FIG. 8. FIG. 8 is an enlarged schematic plan view showing a state in which the principal part of a core-containing layer 25 exposed from a medium sliding surface 26 is inclined at an azimuth angle θ to one surface 60a of a base plate 60, in a manner similar to that in the first embodiment shown in FIG. 4. In FIG. 8, the same components of a magnetic head 21 of the second embodiment as those in the first embodiment are denoted by the same reference numerals, and a description thereof is omitted or simplified.

Referring to FIG. 8, first and second shielding layers 51 and 52 are composed of a magnetic material such as a NiFe alloy, and have a width larger than the track width Tw of an MR element 54. A marker layer 65 that is convex in plan view is disposed on a side of the first shielding layer 51 remote from the MR element 54. That is, the marker layer 65 having a predetermined thickness in plan view is disposed on the first shielding layer 51 substantially parallel to the direction of the track width Tw of the MR element 54. Both end portions 65a of the marker layer 65 steeply rise from the first shielding layer 51. Preferably, the thicknesses of the first and second shielding layers 51 and 52 are set within the range of 1 μm to 4 μm.

The marker layer 65 is also composed of a magnetic material such as a NiFe alloy, in a manner similar to that in the first shielding layer 51. In particular, when the material of the marker layer 65 is the same as that of the first shielding layer 51, the number of kinds of materials is reduced, and the structure of the magnetic head 21 can be simplified. Preferably, the marker layer 65 is formed by plating. Plating allows both end portions 65a of the marker layer 65 to steeply rise from the first shielding layer 51. Consequently, the width accuracy of the marker layer 65 is increased, and the MR element 54 can be easily positioned by using the marker layer 65.

A description will now be given of the positional relationship between the marker layer 65 and the MR element 54.

In FIG. 8, two imaginary azimuth lines A and B are shown, in a manner similar to that in the first embodiment. A major part of the marker layer 65 is positioned inside the imaginary azimuth lines A and B in the direction of the track width Tw. Both end portions 65a of the marker layer 65 are provided outside the imaginary azimuth lines A and B in the direction of the track width Tw.

One normal line D is also shown in FIG. 8. The normal line D is a straight line passing through a center 54b of the MR element 54 in the direction of the track width Tw and intersecting that direction at right angles. The marker layer 65 is positioned so that the normal line D passes through a center 65b thereof.

Since the major part of the marker layer 65 is disposed inside the imaginary azimuth lines A and B in the direction of the track width Tw, it inevitably opposes the entire MR element 54 in the rotating direction of the magnetic head 21. Also, since the end portions 65a of the marker layer 65 are disposed outside the imaginary azimuth lines A and B in the direction of the track width Tw, the width of the marker layer 65 is larger than the track width Tw of the MR element 54. More specifically, it is preferable that the width of the marker layer 65 be within the range of 5 μm to 25 μm and be larger than the track width Tw. It is also preferable that the thickness of the marker layer 65 be within the range of 2 μm to 4 μm.

When the marker layer 65 and the MR element 54 are positioned in such a relationship, the end portions 65a of the marker layer 65 do not exist inside the imaginary azimuth lines A and B. Therefore, the asymmetry (symmetry of the reproduced signal) of the magnetic head 21 will not change in the direction of the track width Tw of the MR element 54.

In particular, when the marker layer 65 is provided substantially parallel to the direction of the track width Tw of the MR element 54, changes in asymmetry of the MR element 54 in the overall direction of the track width Tw is reduced extremely.

Since the center 65a of the marker layer 65 and the center 54b of the MR element 54 are placed on the normal line D, they are aligned along the normal line D. Consequently, it is possible to easily determine the center of the MR element 54b by detecting the center of the marker layer 65, and to thereby easily adjust the height of the MR element 54.

In particular, when the marker layer 65 is substantially parallel to the direction of the track width Tw of the MR element 54, the height of the MR element 54 can be adjusted more easily.

In the magnetic head 21 of the second embodiment, the marker layer 65 may be composed of a nonmagnetic material. In this case, the influence of the marker layer 65 on the asymmetry is substantially lessened, and changes in the asymmetry can be reduced further.

Third Embodiment

Figure 9:
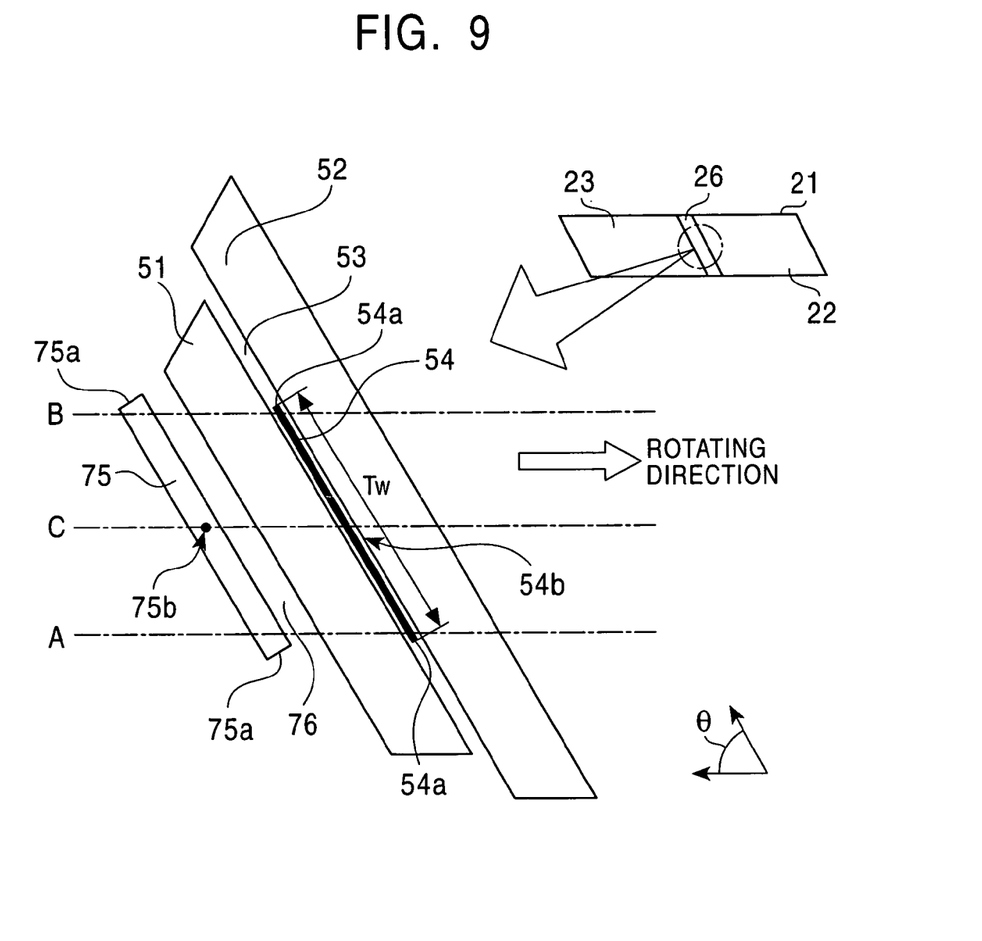
FIG. 9 is an enlarged schematic plan view showing a state in which a core-containing layer exposed from a medium sliding surface of the magnetic head according to a third embodiment of the present invention is inclined at an azimuth angle θ.

A third embodiment of the present invention will now be described with reference to FIG. 9. FIG. 9 is an enlarged schematic plan view showing a state in which the principal part of a core-containing layer 25 exposed from a medium sliding surface 26 is inclined at an azimuth angle θ to one surface 60a of a base plate 60, in a manner similar to that in the first embodiment shown in FIG. 4. In FIG. 9, the same components of a magnetic head 21 of the third embodiment as those in the first embodiment are denoted by the same reference numerals, and a description thereof is omitted or simplified.

In particular, since the positional relationship between a marker layer and an MR element is similar to that in the first embodiment, a description thereof is omitted.

Referring to FIG. 9, first and second shielding layers 51 and 52 are composed of a magnetic material such as a NiFe alloy, and have a width larger than the track width Tw of an MR element 54. A marker layer 75 that is substantially rectangular in plan view is disposed on a side of the first shielding layer 51 remote from the MR element 54 with another nonmagnetic insulating layer 76 therebetween.

That is, the marker layer 75 having a predetermined thickness in plan view is disposed on the nonmagnetic insulating layer 76 substantially parallel to the direction of the track width Tw of the MR element 54. Both end portions 75a of the marker layer 75 rise steeply. Preferably, the thicknesses of the first and second shielding layers 51 and 52 are set within the range of 1 μm to 4 μm, and the thickness of the nonmagnetic insulating layer 76, that is, the distance between the marker layer 75 and the first shielding layer 51, is set within the range of 0.2 μm to 0.5 μm. In such a case in which the nonmagnetic insulating layer 76 is interposed between the marker layer 75 and the first shielding layer 51, the distance between the MR element 54 and the marker layer 75 is increased. This can reduce the influence of the marker layer 75 on the asymmetry.

The marker layer 75 is also composed of a magnetic material such as a NiFe alloy, in a manner similar to that in the first shielding layer 51. In particular, when the material of the marker layer 75 is the same as that of the first shielding layer 51, the number of kinds of materials is reduced, and the structure of the magnetic head 21 can be simplified. Preferably, the marker layer 75 is formed by plating. Plating allows both end portions 75a of the marker layer 75 to steeply rise from the first shielding layer 51. Consequently, the width accuracy of the marker layer 75 is increased, and the MR element 54 can be easily positioned by using the marker layer 75.

In the magnetic head 21 of the third embodiment, the marker layer 75 may be composed of a nonmagnetic material. In this case, the influence of the marker layer 75 on the asymmetry is substantially lessened, and changes in the asymmetry can be reduced further. The center 75b of the marker layer 75 and the center 54b are aligned alone the head center line C.

EXAMPLES

A magnetic head of a first example was produced which had the same configuration as that in FIG. 8 except that the track width Tw of an MR element 54 was 6 μm, the width of a marker layer 65 was 10.2 μm, the thickness of the marker layer 65 was 2 μm, the thickness of a first shielding layer 51 was 2.5 μm, and the azimuth angle θ was 25°.

Figure 10:
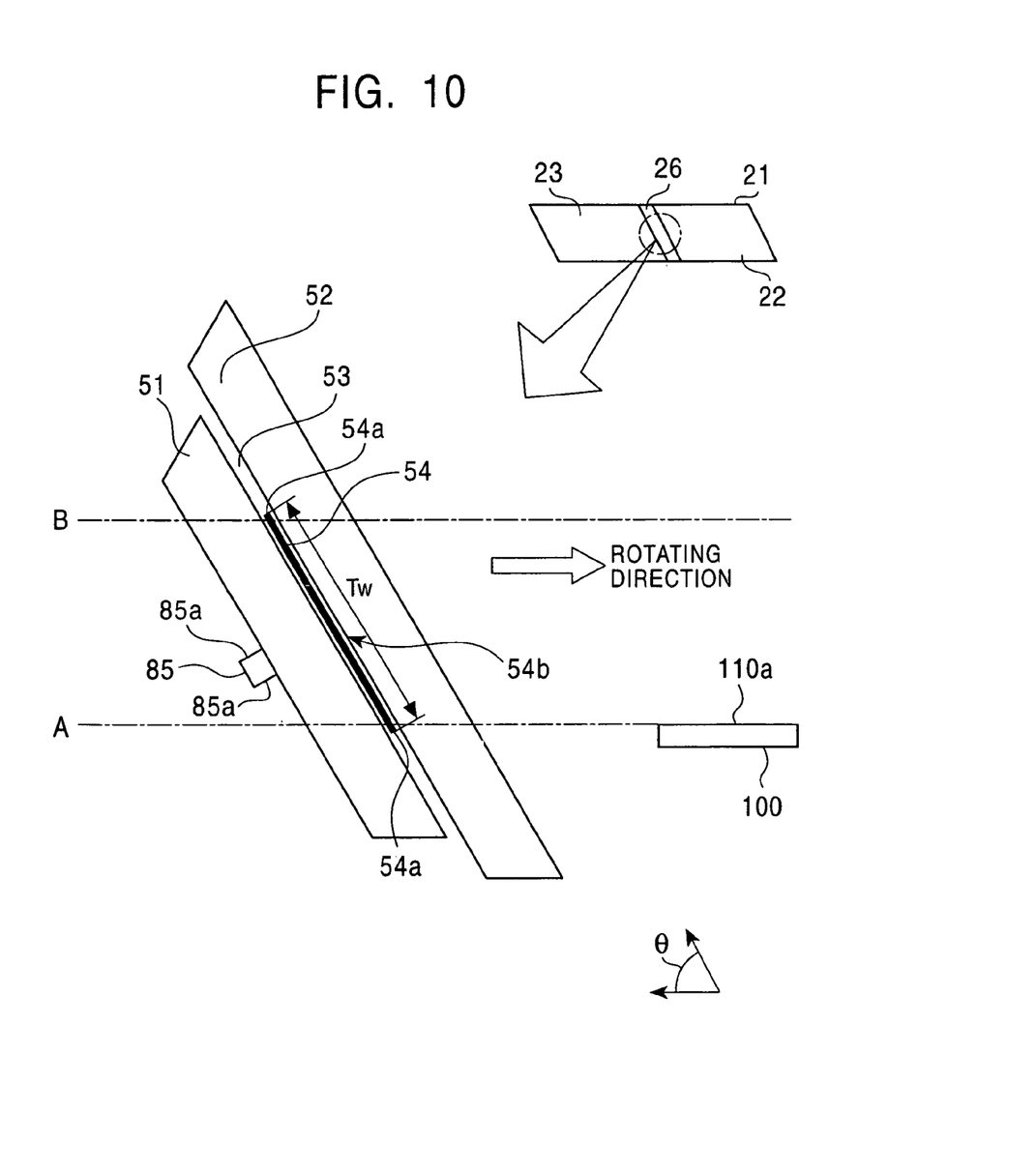
FIG. 10 is an enlarged schematic plan view showing a state in which a core-containing layer exposed from a medium sliding surface of a magnetic head according to a first comparative example is inclined at an azimuth angle θ.

Furthermore, a magnetic head of a first comparative example was produced which had the same configuration as that in FIG. 10 except that the track width Tw of an MR element 54 was 6 μm, the width of a marker layer 85 was 2 μm, the thickness of the marker layer 85 was 2 μm, the thickness of a first shielding layer 51 was 2.5 μm, and the azimuth angle θ was 25°.

FIG. 10 shows a known type of magnetic head in which both end portions 85a of a marker layer 85 are disposed inside imaginary azimuth lines A and B in the direction of the track width.

In the magnetic head of the first comparative example, reproduced signals corresponding to a written test track 100 having a width of 2 μm were repeatedly measured with the MR element 54 while moving the track 100 from the side of the imaginary azimuth line A toward the imaginary azimuth line B, as shown in FIG. 10. The asymmetry was calculated on the basis of the reproduced signals in each measuring operation, and the changes in asymmetry in the direction of the track width of the MR element 54 were examined. The examination result is shown in FIG. 11.

Similarly, the changes in asymmetry in the direction of the track width of the MR element 54 in the magnetic head of the first example were examined. The examination result is shown in FIG. 12.

Figure 11:
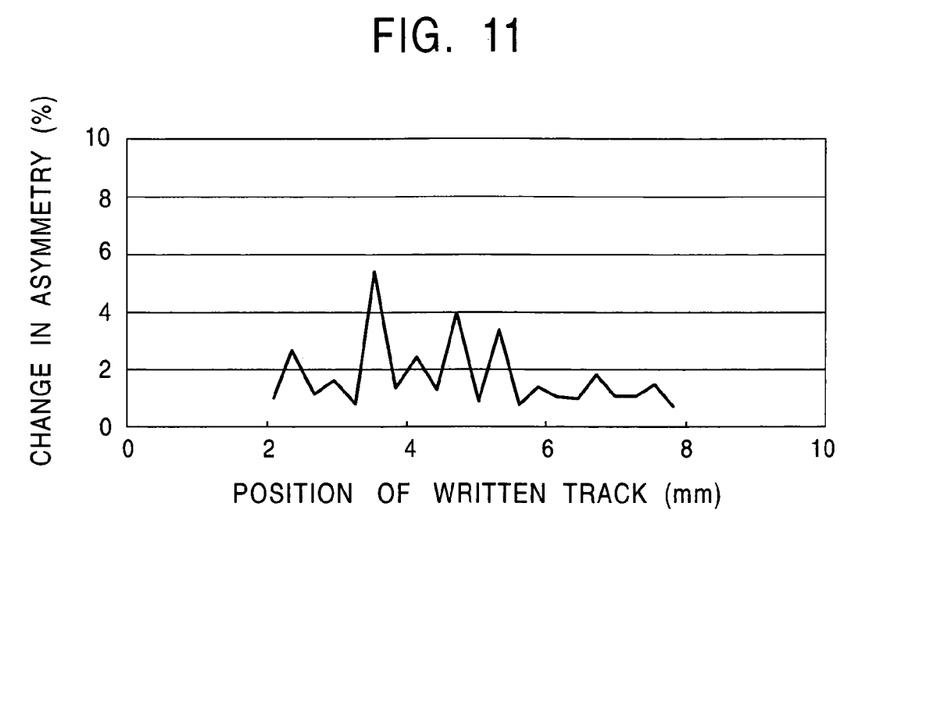
FIG. 11 is a graph showing changes in asymmetry in the magnetic head of the first comparative example.
Figure 12:
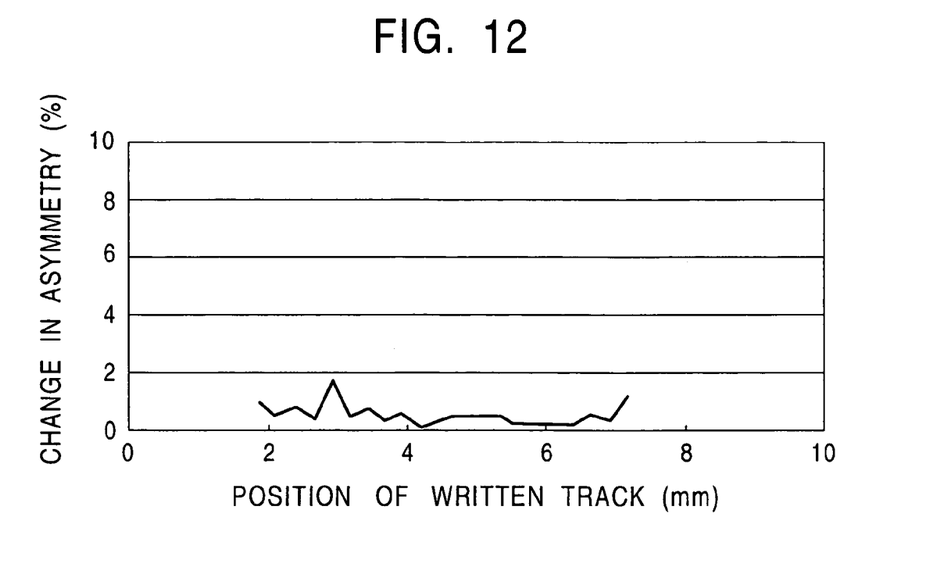
FIG. 12 is a graph showing changes in asymmetry in a magnetic head of a first example.

FIGS. 11 and 12 are graphs in which the horizontal axis represents the position of the written track 100, and the vertical axis represents the change in asymmetry. In the graphs, 0 μm indicates that an upper end 110a of the written track 100 is placed on the imaginary azimuth line A, as shown in FIG. 10.

As shown in FIG. 11, in the magnetic head of the first comparative example, both end portions of the marker layer are disposed inside the imaginary azimuth lines A and B in the direction of the track width, and therefore, the asymmetry changes substantially.

In contrast, in the magnetic head of the first example, both end portions of the marker layer are disposed outside the imaginary azimuth lines A and B in the direction of the track width, and therefore, the amount of change in asymmetry is relatively small.

That is, since the end portions of the marker layer do not exist inside the two imaginary azimuth lines in the magnetic head of the first example, the asymmetry of the magnetic head does not change in the overall direction of the track width of the MR element, and stable reading characteristics can be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetic head disposed on a rotary cylinder rotatable in a predetermined direction, and having a medium sliding surface substantially flush with a peripheral surface of the rotary cylinder, the magnetic head comprising:

a first shielding layer composed of a magnetic material;

a second shielding layer spaced from the first shielding layer substantially parallel thereto and composed of a magnetic material;

a magnetoresistive element provided between the first and second shielding layers and insulated from the first and second shielding layers by a nonmagnetic insulating layer; and a marker layer disposed on a side of the first shielding layer remote from the magnetoresistive element so as to determine the center in a track-width direction of the magnetoresistive element, wherein the layers and the element are exposed from the medium sliding surface while being inclined at a predetermined azimuth angle to the predetermined direction, and wherein a major part of the marker layer is disposed inside two imaginary azimuth lines in the track-width direction, the imaginary azimuth lines extending straight in the predetermined direction through both end portions in the track-width direction of the magnetoresistive element, and both end portions of the marker layer are disposed outside the imaginary azimuth lines in the track-width direction.

2. A magnetic head according to claim 1, wherein the marker layer is positioned so that a head center line extending straight in the predetermined direction through the center in the track-width direction of the magnetoresistive element passes through the center in the track-width direction of the marker layer.

3. A magnetic head according to claim 1, wherein the marker layer is positioned so that a normal line extending straight through the center in the track-width direction of the magnetoresistive element in a direction orthogonal to the track-width direction passes through the center in the track-width direction of the marker layer.

4. A magnetic head according to claim 1, wherein the marker layer is composed of a magnetic material.

5. A magnetic head according to claim 1, wherein the marker layer is composed of a nonmagnetic material.

6. A magnetic head according to claim 1, wherein the marker layer is in contact with the first shielding layer.

7. A magnetic head according to claim 1, wherein another nonmagnetic insulating layer is provided between the marker layer and the first shielding layer.

8. A magnetic head according to claim 1, wherein the medium sliding surface extends in the predetermined direction.

9. A magnetic head according to claim 1, wherein the medium sliding surface is curved in a direction orthogonal to the predetermined direction.

10. A tape-medium reading and writing apparatus having a tape loading path in which a magnetic tape medium drawn out of a tape reel is wound on a rotary cylinder that is rotatable in a predetermined direction,
   wherein the rotary cylinder has a magnetic head with a medium sliding surface substantially flush with a peripheral surface of the rotary cylinder, the magnetic head comprising:
   a first shielding layer composed of a magnetic material;
   a second shielding layer spaced from the first shielding layer substantially parallel thereto and composed of a magnetic material;
   a magnetoresistive element provided between the first and second shielding layers and insulated from the first and second shielding layers by a nonmagnetic insulating layer; and
   a marker layer disposed on a side of the first shielding layer remote from the magnetoresistive element so as to determine the center in a track-width direction of the magnetoresistive element,
   wherein the layers and the element are exposed from the medium sliding surface while being inclined at a predetermined azimuth angle to the predetermined direction, and
   wherein a major part of the marker layer is disposed inside two imaginary azimuth lines in the track-width direction, the imaginary azimuth lines extending straight in the predetermined direction through both end portions in the track-width direction of the magnetoresistive element, and both end portions of the marker layer are disposed outside the imaginary azimuth lines in the track-width direction.

11. A tape-medium reading and writing apparatus according to claim 10, wherein the marker layer is positioned so that a head center line extending straight in the predetermined direction through the center in the track-width direction of the magnetoresistive element passes through the center in the track-width direction of the marker layer.

12. A tape-medium reading and writing apparatus according to claim 10, wherein the marker layer is positioned so that a normal line extending straight through the center in the track-width direction of the magnetoresistive element in a direction orthogonal to the track-width direction passes through the center in the track-width direction of the marker layer.

13. A tape-medium reading and writing apparatus according to claim 10, wherein the tape loading path comprises:
   guide posts provided on the upstream and downstream sides of the rotary cylinder to guide the magnetic tape medium drawn out of the tape reel onto the rotary cylinder; and
   a capstan provided on the downstream side of the rotary cylinder to feed the magnetic tape medium.

14. A tape-medium reading and writing apparatus according to claim 10, wherein the marker layer is composed of a magnetic material.

15. A tape-medium reading and writing apparatus according to claim 10, wherein the marker layer is composed of a nonmagnetic material.

16. A tape-medium reading and writing apparatus according to claim 10, wherein the marker layer is in contact with the first shielding layer.

17. A tape-medium reading and writing apparatus according to claim 10, wherein another nonmagnetic insulating layer is provided between the marker layer and the first shielding layer.

18. A tape-medium reading and writing apparatus according to claim 10, wherein the medium sliding surface extends in the predetermined direction.

19. A tape-medium reading and writing apparatus according to claim 10, wherein the medium sliding surface is curved in a direction orthogonal to the predetermined direction.

* * * * *